United States Patent [19]

Leon et al.

[11] 4,421,446
[45] Dec. 20, 1983

[54] BAR FEED MECHANISM

[75] Inventors: Theodoor P. C. Leon; Joseph F. Berns, Jr., both of Cincinnati, Ohio

[73] Assignee: Manurhin Automatic Division of Mitac, Inc., Cincinnati, Ohio

[21] Appl. No.: 286,363

[22] Filed: Jul. 23, 1981

[51] Int. Cl.³ .............................................. B23B 13/10
[52] U.S. Cl. ...................................... 414/17; 29/252; 82/2.7
[58] Field of Search .................................... 414/15–17; 144/245 R; 82/2.5, 2.7; 198/747; 29/252

[56] References Cited

U.S. PATENT DOCUMENTS

| | | | |
|---|---|---|---|
| 2,548,786 | 4/1951 | Harney | 414/17 |
| 2,572,741 | 10/1951 | McCoy | 414/17 |
| 2,577,203 | 12/1951 | Mariotte | 414/17 |
| 3,074,566 | 1/1963 | MacBlane | 414/17 |

Primary Examiner—Leslie J. Paperner
Assistant Examiner—Terrance L. Siemens
Attorney, Agent, or Firm—Frost & Jacobs

[57] ABSTRACT

A bar feed mechanism for a machine tool comprising at least one cylindrical tube adapted to be aligned with a spindle of the machine tool, a piston movable in the tube, a shaft rotatably secured to the piston, a centering sleeve rotatably mounted on the shaft and axially movable thereon, center elements secured to the shaft at the end remote from the piston, a bushing at the end of the tube adjacent the machine tool having an orifice which permits passage of the center means therethrough but retains the centering sleeve, an hydraulic pressure inlet for admitting pressure fluid behind the piston to cause movement thereof in a feeding direction, apparatus to admit pressure fluid between the piston and centering sleeve, and pressure relief apparatus to permit discharge of pressure fluid from the tube between the piston and centering sleeve when the sleeve abuts the bushing, thereby permitting continued movement of the piston, shaft and center elements in the feeding direction. A plurality of tubes may be provided in side-by-side parallel relation with the axes of all tubes lying in a single plane. Apparatus are provided to align each of the plurality of tubes with the spindle of a machine tool, and to reload a tube with a length of fresh bar stock.

17 Claims, 10 Drawing Figures

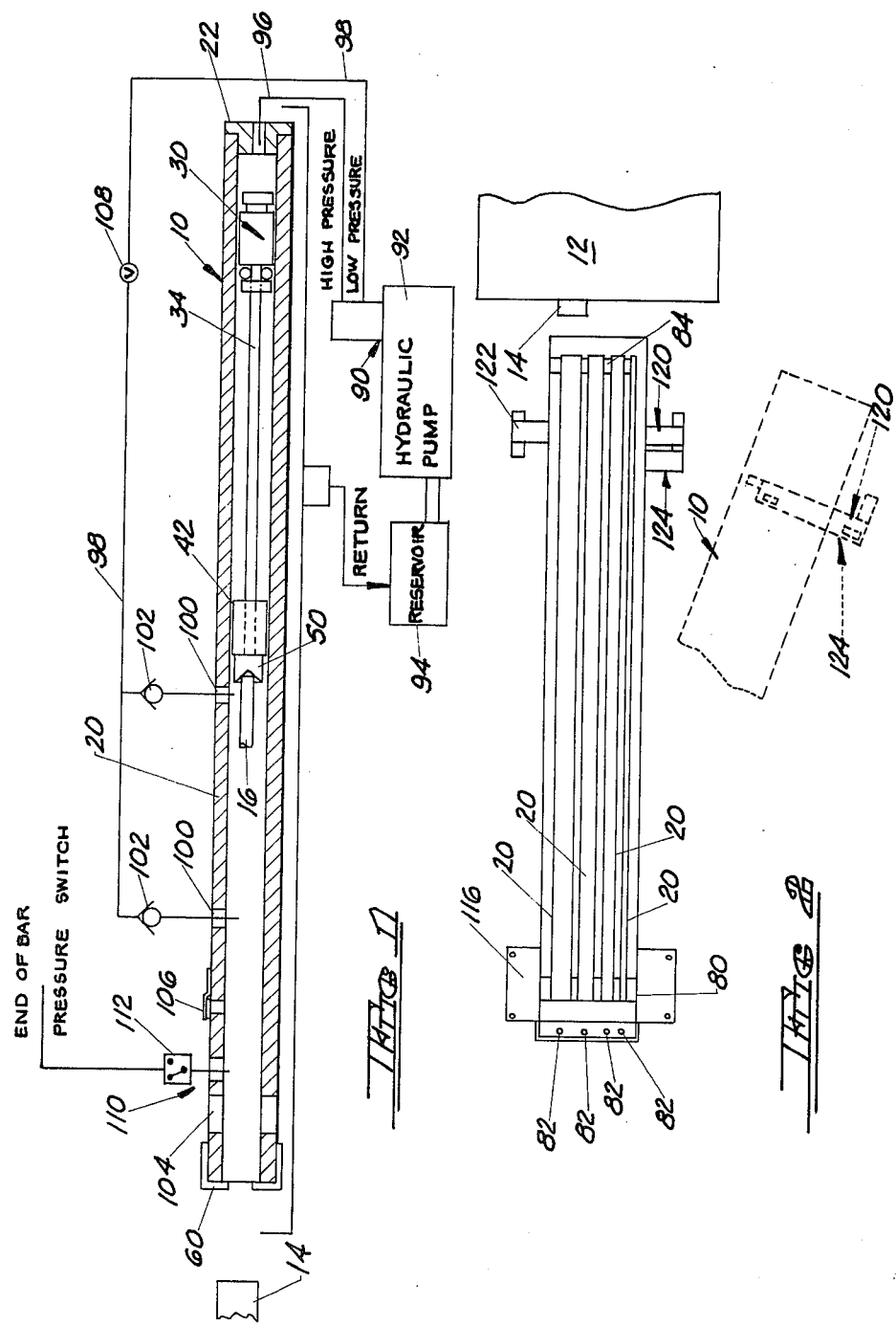

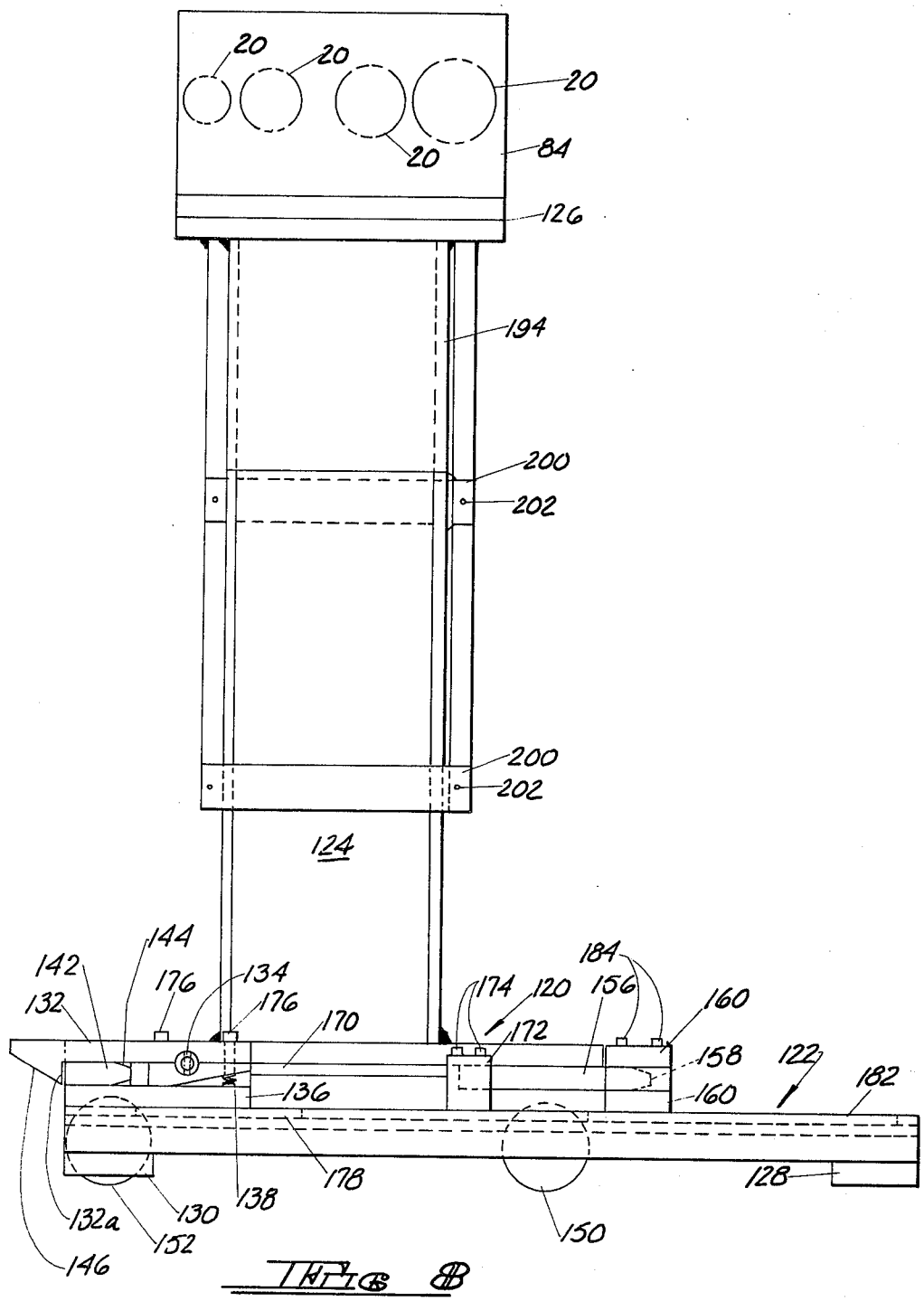

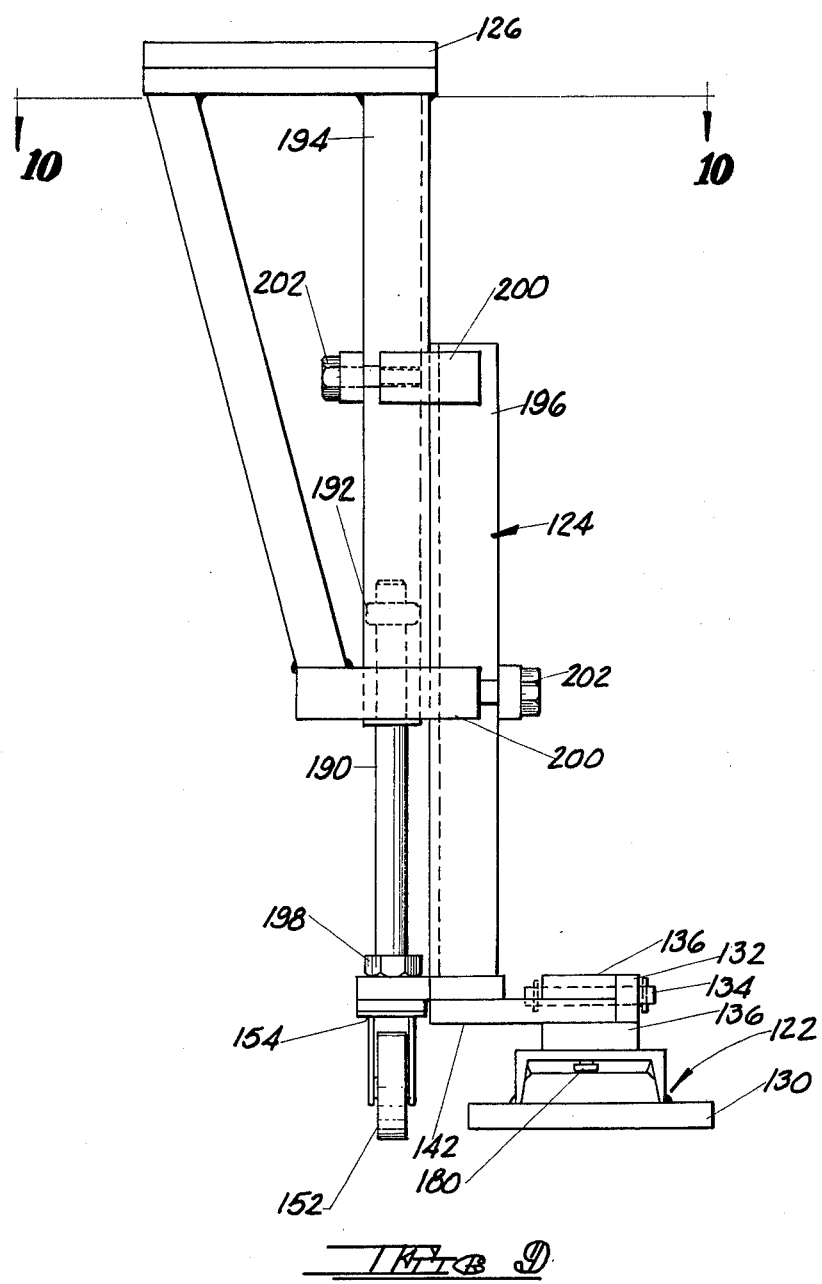

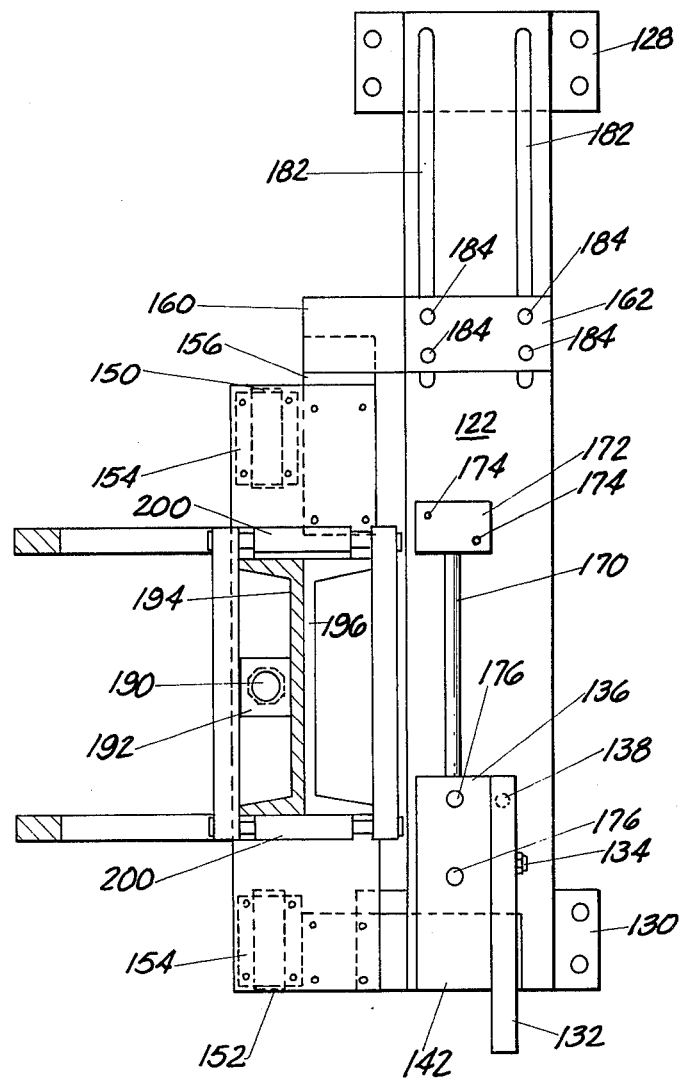

BAR FEED MECHANISM

BACKGROUND OF THE INVENTION

This invention relates to a bar feed mechanism actuated by hydraulic fluid for advancing elongated bar stock into the spindle of a machine tool such as an automatic or semi-automatic lathe, screw machine and the like.

Feed devices for bar stock are well known which utilize mechanical and/or pneumatic means for feeding bar stock. These have the disadvantages of noisy operation and tendency to damage the bar stock when rotated by the spindle of the machine tool. Hydraulic bar feed devices have also been developed which avoid the above disadvantages, but to the best of applicant's knowledge none of the prior art hydraulic bar feed devices has been completely successful due to one or more of the drawbacks of relatively complex and hence expensive structure; in some instances inability to retract the feeding device hydraulically after a length of stock is used up; failure to prevent oscillation of the bar stock during feeding, particularly when the bar stock is rotated rapidly; difficult and time-consuming arrangements for reloading with a fresh length of bar stock; and inability to accommodate a wide range of diameters (or cross-sectional shapes) of bar stock.

It is a principal object of this invention to provide a bar feed mechanism which avoids the above-noted disadvantages of prior art mechanical, pneumatic and hydraulic bar stock feeding apparatus.

To this end there is provided, in accordance with the present invention, a bar feed mechanism comprising a cylindrical tube, a piston movable axially within the tube, a shaft rotatably secured to the piston and projecting therefrom toward the machine tool, a cylindrical centering sleeve rotatably mounted on the shaft and axially movable thereon, center means secured to the shaft at the end thereof remote from the piston, the center means having a concave surface for engaging the trailing end of a bar, a bushing at the end of the tube adjacent the machine tool having an orifice which permits passage of the centering means therethrough but retains the centering sleeve, an hydraulic pressure inlet for admitting fluid behind the piston to cause movement thereof in a feeding direction, means to admit pressure fluid between the piston and the centering sleeve, and pressure relief means to permit drainage of hydraulic fluid from the tube between the piston and centering sleeve when the sleeve abuts the bushing. Preferably a reversible pump is provided to withdraw hydraulic fluid from the tube under subatmospheric pressure, thereby effecting retraction of the piston, shaft, sleeve and center means after completion of a feeding stroke.

U.S. Pat. No. Re. 29,905 discloses a cylindrical tube, a piston in the tube, a stock pusher comprising a rod with a pushing head having a conical recess which engages a piece of bar stock. Hydraulic fluid under pressure acts on the piston to push the bar stock toward a machine tool. The piston is provided with an inner channel having an adjustable cross-section and regulating means in the inner channel for adjusting the cross section, so that oil supplied under pressure passes the piston with loss of pressure in an amount determined by the regulating means. The piston is provided with clearance around the outside thereof relative to the tube, and the pushing head has greater clearance in the tube than the piston. There is also provided a ball-check valve allowing oil to flow from behind the piston to the front of it when it is desired to return the bar pushing mechanism for reloading.

U.S. Pat. No. 4,217,800 discloses a bar feed device comprising a guide tube which may be a pneumatic or hydraulic cylinder having at the rear end thereof a closed tube of smaller diameter. A first piston is slidable in the larger diameter guide tube and is provided with a holder having a stepped opening for insertion of a rod. The holder is rotatable with respect to the primary piston body. A second piston is provided having a telescoping engagement with the first piston, and the second piston is provided with an ejection rod which projects forwardly through the holder. An embodiment adapted for thin rod materials includes an additional piston in front of the first piston and a buckle guide tube, in order to prevent buckling of thin rods during feeding. Reloading of a new bar is effected manually after exhausting pressure behind the first piston.

U.S. Pat. No. 4,034,632 discloses a bar feed device comprising a feed tube having a feed piston therein with two telescoping parts. The smaller diameter part or piston has on its front end a centering head which is rotatable and provided with a conical bore to receive the end of a bar to be fed. The larger part or piston is first caused to move toward the machine tool by fluid pressure until it abuts against a stop, after which hydraulic fluid passing through apertures therein acts on the rear of the smaller part or piston and forces it farther in the feeding direction. The smaller piston and centering head have an outside diameter which permits them to enter the spindle hole of the machine tool. A back rest in the form of rollers and associated cams actuated by pneumatic means is provided to prevent oscillation of the bar stock.

U.S. Pat. No. 3,074,566 discloses a bar feed having an outer tube and a concentric inner tube forming a cylinder within which a piston reciprocates. At the forward end of the inner tube a two-piece bushing is provided which is removably held in place, and bushings of different size apertures may be provided for bar stock of different diameters. The piston is provided with a flexible cup or gasket to vary the clearance at the rearward end thereof. A plurality of bearings is arranged within the inner tube in front of the piston which are rotatable and slidable within the tube. A separate socket having a conical recess at the outer end thereof is provided in front of the bearings, and the socket and bearings may rotate with the bar stock without transmitting rotation back to the piston. It is contemplated that the socket and some of the bearing members may enter the spindle of a lathe in order to feed all of the bar into the lathe. This in turn forces the bushing out of the end of the inner tube. Pressure fluid is admitted into the outer tube and passes from the outer tube into the rear of the inner tube through an opening provided therein.

U.S. Pat. No. 2,701,355 discloses a hydraulically operated bar feed device having a tube, a reciprocating piston, the piston being of two-piece construction, at the front end of which is a reduced shank having a recessed depression to engage the end of a bar. The forward end of the tube is crimped inwardly to form a stop through which the shank passes but which retains a shoulder of the enlarged body portion of the piston. At the other end of the piston a washer is provided with means for adjusting the seal fit of the washer. Such an arrangement can feed only a single size of bar stock.

U.S. Pat. No. 2,572,741 discloses a bar feed device comprising a tube, a plunger, a shaft extending forwardly of the plunger, a stem extending rearwardly from the plunger, and a traveler having a conical recess at the end thereof to engage a piece of bar stock. The plunger includes sections through which the stem extends and on which they are slidable. The shaft is of relatively small diameter and is connected to the traveler in such manner that it may both slide and turn therein. The forward end of the traveler is reduced in diameter to form a pilot portion which can project beyond the discharge end of the feed tube, but the rear portion of the traveler is of a diameter which is retained when it abuts the discharge end. This arrangement is actuated by compressed air and apparently is reloaded with a fresh bar manually after air pressure is vented from the rear end of the tube.

Other prior art relating to bar feed mechanism include U.S. Pat. Nos. 2,300,457; 2,334,272; 2,548,786; 3,162,315 and British Patent No. 1,201,904.

A preferred bar feed mechanism for a machine tool, in accordance with the invention, comprises at least one elongated cylindrical tube of uniform inside diameter, closure means at the end of the tube remote from the machine tool, a piston movable axially within the tube, a pusher shaft rotatably secured to the piston and projecting therefrom toward the machine tool, a cylindrical centering sleeve rotatably mounted on the shaft and axially movable thereon within the tube, the piston and the centering sleeve each having a close sliding fit within the tube, center means releasably secured to the shaft at the end thereof remote from the piston, the center means having a concave surface at its end remote from the piston for engaging a trailing end of a bar being fed to the machine tool, the centering sleeve being interposed on the shaft between the piston and the center means, a bushing at the end of the tube adjacent the machine tool having an axial orifice therein of a diameter sufficient to permit passage of the center means therethrough but to retain the sleeve, a source of hydraulic fluid under pressure, an inlet for the pressure fluid in the closure means at the end of the tube remote from the machine tool for moving the piston and the shaft toward the machine tool in a feeding direction, at least one additional inlet intermediate the ends of the tube for admitting pressure fluid ahead of the center means, means to admit pressure fluid between the piston and the centering sleeve, and pressure relief means in the tube effective after movement of the sleeve therebeyond in the feeding direction to drain pressure fluid from the tube between the sleeve and piston whereby to permit continued movement of the piston, shaft and center means in the feeding direction.

BRIEF DESCRIPTION OF THE DRAWING

Reference is made to the accompanying drawing wherein:

FIG. 1 is a diagrammatic vertical sectional view of a bar feed mechanism embodying the invention.

FIG. 2 is a top plan view of a bar feed mechanism of the invention, illustrating the manner of reloading.

FIG. 3 is a fragmentary diagrammatic sectional view of a bar feed mechanism of the invention on an enlarged scale.

FIG. 7 is a diagrammatic illustration of an arrangement of a plurality of cylindrical tubes in a bar feed mechanism embodying the invention.

FIGS. 8 and 9 are front and side plan views, respectively, of a front stand for an assembly of cylindrical tubes in accordance with the invention.

FIG. 10 is a sectional view taken on the line 10—10 of FIG. 9.

DETAILED DESCRIPTION

Figure 5:
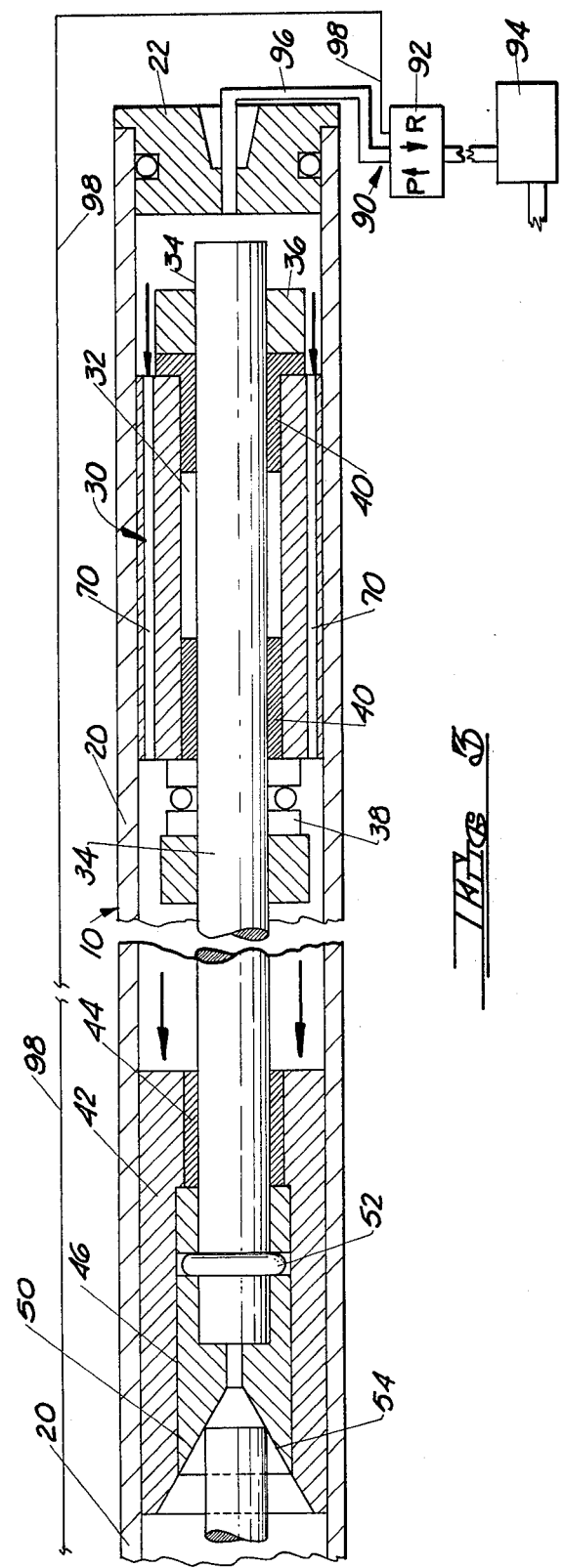
FIGS. 4 and 5 are diagrammatic sectional views of center means adapted to engage bar stock of relatively large and relatively small diameter, respectively.

Referring to FIGS. 1-6 of the drawing, a bar feed mechanism embodying the invention is indicated generally at 10, and a machine tool such as a lathe or screw machine is indicated generally at 12, having a spindle 14 (FIGS. 1 and 2), into which a length of bar stock indicated at 16 is fed. For clarity of illustration FIGS. 1, 3-6 show only a single cylindrical tube, but as shown in FIGS. 2 and 7, a plurality of tubes of the same or different diameters may be provided, which will be described in detail hereinafter.

The mechanism 10 is provided with an elongated cylindrical tube 20 of uniform inside diameter. Closure means 22 is provided at the end of tube 20 remote from lathe 12; the closure means is preferably formed from steel and is readily removable from the tube 20. An O-ring (not shown) may be provided to insure a pressure-tight fit.

A piston is indicated generally at 30 which is movable axially within the tube 20. The outside diameter of piston 30 provides a close sliding fit within tube 20. In the embodiment of FIG. 3, piston 30 is provided with an axial central bore 32 extending therethrough which accommodates a pusher shaft indicated at 34. Shaft 34 is secured within bore 32 in such manner as to be rotatable with respect to piston 30 but fixed for unison axial movement therewith, as by means 36. It will be understood that shaft 34 may be secured to piston 30 at varying positions along the length of shaft 34 in order to adjust the distance by which it projects toward the lathe 12.

Piston 30 is preferably provided with a thrust bearing indicated at 38 at its leading end, i.e. at the end facing machine tool 12. Oilite bearings indicated at 40 may also be provided adjacent each end of piston 30.

A cylindrical centering sleeve indicated at 42 is rotatably mounted on the pusher shaft and is also axially movable thereon. Centering sleeve 42 has a close sliding fit within tube 20 in the same manner as piston 30. Sleeve 42 is preferably provided with bearing means 44 at the trailing end thereof, i.e. at the end remote from the machine tool 12. In the embodiment of FIG. 3, sleeve 42 is provided with an axial bore 46 extending partially therethrough from the leading end thereof, i.e. the end facing machine tool 12, the diameter of said bore being such as to permit telescoping therein of a center means indicated at 50.

Center means 50 is releasably secured to the end of pusher shaft 34 at the end thereof remote from piston 30 by a roll pin indicated at 52 inserted through a bore. At its leading end center means 50 is provided with a concave surface indicated at 54, preferably of frusto-conical form, which engages the trailing end of the bar 16 which is to be fed to the lathe 12. When the center means is secured to the shaft, it will of course be evident that the centering sleeve 42 is slidable axially from a position abutting the leading end of piston 30 to a position abutting the trailing end of center means 50.

At the end of tube 10 adjacent the machine tool 12, a bushing is provided indicated at 60. Bushing 60 has an axial orifice 62 therein of a diameter sufficient to permit passage of the center means 50 therethrough but to retain sleeve 42 as shown in FIG. 6.

Figures 4, 5:
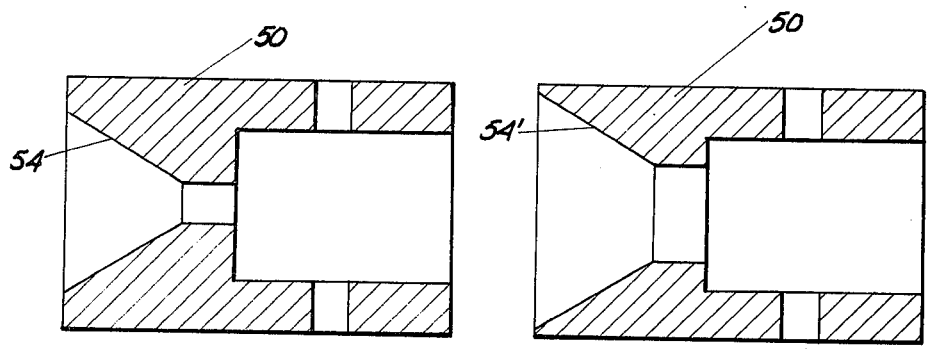
Figure 27:
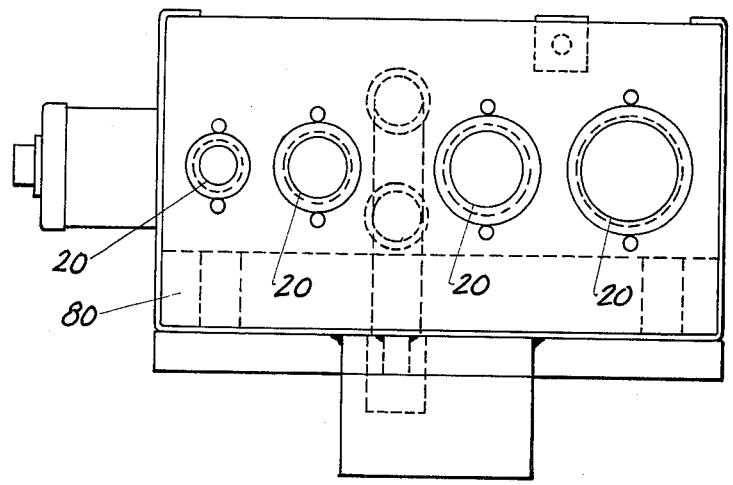

Reference is next made to FIGS. 4 and 5 illustrating interchangable center means 50 adapted to engage bar stock of varying diameters. It will be noted that the outside diameter of the center means 50 of FIG. 4 is the same as that of center means 50 of FIG. 5, but the concave surface 54' of FIG. 5 is substantially larger than surface 54 of FIG. 4. By way of example, the concave surface 54 of FIG. 4 may be of a size to engage bar stock of about ½ inch diameter while concave surface 54' may be of a size to accommodate bar stock of about 1 inch diameter. Since center means 50 is releasably secured by means of pin 52, a variety of bar stock diameters ranging e.g. between ½ inch and 1 inch may be fed in a tube of 1¼ inch diameter. Similarly, bar stock ranging from 2 inches to 3 inches in diameter can be run in a tube of 3½ inch diameter.

Figure 6:
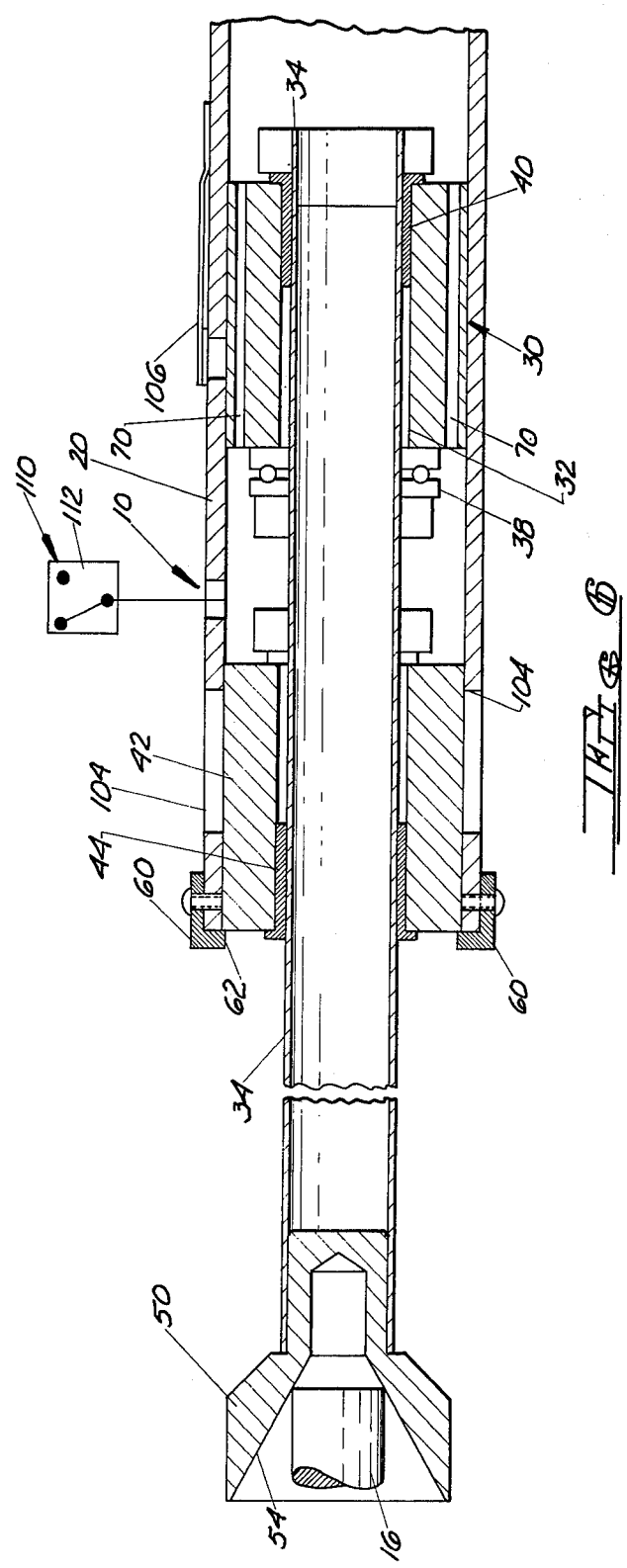
FIG. 6 is a diagrammatic fragmentary sectional view illustrating a preferred embodiment.

FIG. 6 illustrates a preferred embodiment adapted to engage bar stock of relatively large diameter, relative to the inside diameter of the tube 20. In the embodiment of FIG. 6, center means 50 is releasably secured in the end of a tubular pusher shaft 34 by a press fit. The outside diameter of center means 50 is such that it will pass through bushing 60, while sleeve 42 is retained by bushing 60, in the same manner as the embodiment of FIGS. 1-3. However, the outside diameter of center means 50 in FIG. 6 is such, relative to sleeve 42, that it does not telescope within sleeve 42 but rather the leading end of sleeve 42 can abut the trailing end of center means 50 during movement in the feeding direction, before center means 50 has passed beyond bushing 60. Sleeve 42 is preferably provided with an oilite bearing 44 at its leading end. It will of course be understood that FIG. 6 illustrates the positioning of the elements near the end of a feed stroke.

FIGS. 3 and 6 further illustrate a preferred manner of construction of piston 30. In this preferred structure piston 30 is provided with one or more through passages 70 arranged annularly around central bore 32, the passages 70 being generally parallel to the axis of piston 30. The passages 70 permit hydraulic fluid to pass through the piston 30 from the rear face thereof into the region between piston 30 and sleeve 42 extending the sleeve to its forward position with minimum loss of hydraulic pressure. This permits a relatively tight sliding fit between the outer surface of piston 30, sleeve 42 and the inner surface of tube 20, thus minimizing the possibility of oscillation of the bar stock, particularly when it is being rotated relatively rapidly as a result of the machining action thereon of lathe 12. It will further be apparent that there is minimum frictional resistance against rotation of the bar stock by reason of the rotatable engagement of shaft 34 within bore 32, and the rotatable mounting of centering sleeve 42 on pusher tube 34. Since hydraulic oil occupies all the space behind piston 30 and between piston 30 and centering sleeve 42 during a feeding stroke, lubrication is insured. The mechanism of the present invention can therefore permit relatively rapid rotation of the bar stock, in comparison to prior art devices of which applicants are aware. It is to be noted that rotation up to 2000 rpm is conventional in machine tools of this type.

A hydraulic system, indicated generally at 90, is shown schematically in FIG. 1. A reversible pump, which may be either of the constant delivery or variable delivery type, is provided as shown at 92 which communicates with a hydraulic reservoir indicated at 94. The output from pump 92 is conducted through a line 96 to closure means 22 having an opening therethrough to the interior of tube 20 behind piston 30. Another line from pump 92, indicated at 98, conducts hydraulic fluid under pressure to at least one additional pressure fluid inlet, two being shown by way of example at 100 in FIG. 1 intermediate the ends of tube 20. Each additional inlet 100 is provided with a one-way or check valve indicated at 102. Line 98 conducts fluid from pump 92 at lower pressure than fluid supplied to line 96. As shown in FIG. 1, the additional inlets 100 are so positioned along tube 20 as to admit hydraulic fluid under low pressure in front of center means 50 (in the feeding direction) and around the bar 16. This fluid provides lubrication and support to bar 16 as it is rotated and fed forward to the machine tool. When sleeve 42 is moved by fluid under high pressure past an inlet 100, check valve 102 is forced into closed position by reason of the higher pressure between sleeve 42 and piston 30 and behind piston 30. This of course prevents high pressure fluid from escaping through inlet 100 and the low pressure line 98. Fluid introduced through inlets 100 is discharged adjacent the front of tube 20 through drain slots 104 into a tank 24 (FIG. 1) which returns the fluid to reservoir 94. The additional inlets continue to admit fluid under pressure ahead of sleeve 42, center means 50 and around bar 16 during the intermediate portion of a feed stroke. Flow in line 98 may be regulated by a valve 108.

There is further provided a pressure relief valve indicated at 106 in FIGS. 1 and 6, and an end of bar sensing means indicated generally at 110 in FIGS. 1 and 6. The pressure relief valve is a one-way valve permitting discharge of hydraulic fluid under pressure but preventing insuction of air on retraction under subatmospheric hydraulic pressure.

It will be noted that the pressure relief valve 106 is so positioned as to permit discharge of pressure fluid therethrough when the centering sleeve 42 has passed it (to the left in FIG. 1) and before piston 30 has reached it. This permits the piston 30 to continue movement in the feeding direction after sleeve 42 has abutted the bushing 60. However, when piston 30 arrives at the position shown in FIG. 6, it covers or blocks pressure relief valve 106 so that the high hydraulic pressure is exerted between piston 30 and sleeve 42, and this actuates the end of bar sensing means 110, causing a switch shown at 112 therein either to turn off hydraulic pump 92 or to send a signal to machine tool 12 that the bar stock 16 is fully consumed.

The feeding operation starts with a fresh length of bar stock 16 inserted in a tube 20 from the front end thereof, and the elements are then aligned in the relative positions shown in FIG. 1. Hydraulic fluid under pressure is admitted into the rear end of tube 20 through line 96, and the piston, pusher shaft, sleeve and center means start movement in the feeding direction, (to the left in FIGS. 1, 3 and 6) until center means 50 contacts bar 16 and pushes it forward to a stop in the lathe 12. Additional fluid under pressure is admitted through inlets 100, and any fluid in advance of the center means 50 is discharged through drain slots 104 or out the end of tube 20 through the apertured bushing 60 and into tank 24 for eventual return to the hydraulic reservoir. As the feeding stroke continues the centering sleeve 42 is forced into close association with and support of the center means 50 because of passage of high pressure fluid through passages 70, thus keeping the bar stock in alignment with the spindle, preventing oscillation thereof and permitting rapid rotation. At the end of the feed stroke, when the center means has been moved to the position shown in FIG. 6, and the length of bar stock is substantially completely consumed, the pressure relief valve 106 is covered by piston 30 and the end of bar sensing means 110 is actuated. As indicated above, the means 110 may send a signal to the machine tool that no more stock is available. A manual reversing switch (not shown) may be provided to cause pump 92 to reverse, so that subatmospheric pressure is exerted at the rear of piston 30 causing it to retract along with pusher shaft 34, sleeve 42 and center means 50. Alternatively, automatic reversing means could be provided. Entrance of air into tube 20 during the retraction stroke is substantially avoided since the open end of tube 20 is blocked, the drain slots 104 are covered initially by the sleeve 42 and since pressure relief valve 106 and valves 102 are one-way valves.

After retraction of the elements back to the position shown in FIG. 1, reloading with a fresh length of bar stock is effected. One of the significant features of the present invention is the arrangement of a plurality of tubes as shown in FIGS. 2 and 7, which facilitates reloading and permits switching to bar stock of different diameters with a minimum of time.

Referring to FIGS. 2 and 7 it will be noted that a generally rectangular block 80 is provided at the end remote from machine tool 12, and that a plurality of feed tubes 20 is secured in block 80 adjacent their ends in parallel side-by-side relation. Each of the tubes may be of a different inside diameter as shown in FIG. 7, or two or more may be of the same diameter. In all instances the axes of all tubes lie in a single, substantially horizontal plane. With this arrangement, which replaces the conventional circular magazine or drum, it is only necessary to shift the block laterally on a rear support stand 116 for block 80 (FIG. 2), in order to select a different tube from that just used, which may be of the same or different diameter. A plurality of pins or bolts is provided as indicated at 82 in FIG. 2, with each pin being in alignment with the axis of a different tube. When it is desired to shift the block 80 laterally, the pins or bolts 82 are retracted, and the selected tube is indexed or aligned with the spindle 14 of machine tool 12, and the pin 82 for that tube mates with a corresponding bore in rear support stand 116 to hold block 80 in a selected position of alignment. Stand 116 is permanently secured to the floor.

A block similar to block 80 is provided adjacent the ends of the assembly of tubes at the end adjacent machine tool 12, this block being indicated at 84 in FIG. 8. Block 84 is supported on a front stand indicated generally at 120 in FIGS. 2, 8, 9 and 10. For reloading, the front stand is provided with means for rolling the front end of the assembly of tubes away from machine tool 12 in an arcuate path, as shown in broken lines in FIG. 2, with one of the pins or bolts 82 acting as a pivot in its mating bore in the rear stand 116.

Referring to FIGS. 8-10, the front stand, indicated generally at 120, comprises a platform section (preferably an inverted channel section) indicated generally at 122 which is permanently affixed to a floor in alignment with spindle 14 of machine tool 12, and a movable section indicated generally at 124 releasably secured to platform section 122. The movable section 124 is provided with a substantially horizontal table 126 at the top thereof which supports the block 84 and tube assembly, the movable section and block and tube assembly thus being adapted, when section 124 is released from attachment to section 122, to swing through at least 90° in either of two directions away from the spindle 14 for reloading.

Platform section 122 is provided under each end thereof with transversely extending supporting feet 128 and 130 which are provided with bores therethrough for insertion of bolts permanently attaching section 122 to the floor. Adjacent one end of section 122 there is provided a latch mechanism comprising a hook-like latching arm indicated at 132 pivotally mounted on a horizontal transverse shaft 134 one end of which is engaged in a block 136 secured to the top surface of the elongated platform section 122. A helical coil spring indicated at 138 in FIGS. 8 and 10 is positioned beneath one end of arm 132 remote from the downwardly depending hook-like projection thereof indicated at 132a, the spring 138 biasing the arm 132 into a normally closed position. As shown in FIG. 8 arm 132 has an inclined lower surface 140 starting beneath shaft 134 extending upwardly over spring 138, thus permitting limited rotation of arm 132 (in a clockwise direction as viewed in FIG. 8) in order to permit passage thereunder of a latching bolt 142 which is secured to and extends transversely from the lower portion of the movable section 124. Bolt 142 is provided with a beveled nose portion 144 which contacts a downwardly sloping lower surface 146 of the hook-like member 132a when section 124 is moved from an open position back into latching engagement with platform section 122. As will be apparent from FIG. 8, contact of beveled portion 144 with sloping surface 146 tilts hook-like portion 132a upwardly, rotating around shaft 134, permitting bolt 142 to move into the position shown in FIGS. 8-10 whereupon spring 138 rotates latch 132 (counterclockwise as viewed in FIG. 8) into a latched position with hook-like member 132a preventing movement of bolt 142.

A pair of casters indicated at 150 and 152 is provided adjacent each end of the lower portion of movable section 124 on which section 124 can be rolled outwardly when released by the previously described latch mechanism. The casters 150, 152 are secured rotatably to the lower surface of section 124 in any conventional manner as indicated at 154 in FIG. 9.

In order to provide stability to the movable section 124 when latched to section 122, the movable section 12 is further provided, at its lower end remote from bolt 142, with a protruding tongue 156 having a beveled nose portion 158 (FIG. 8) received in a bifurcated section 160 which extends transversely and is an integral part of a platform section 122. As will be apparent from FIGS. 8 and 10, when movable section 124 is in the latched position, the tongue 156 is received with a sliding fit between the bifurcations 160 of block 162, thus preventing any tendency toward movement of section 124 which might result from the torque generated by operation of machine tool 12.

As indicated above, the platform section 122 is affixed to a floor permanently in alignment with a spindle of a machine tool. In order to ensure that movable section 124, when in latched position, is in precise alignment with the spindle of a machine tool, adjustment means are provided on platform section 122 which permits transverse movement of the block 136 (and associated latch mechanism 132, 134, 138–146) and block 162 and associated members 156 and 160.

As illustrated in FIGS. 8 and 10, exemplary transverse adjustment means comprise a horizontally disposed gauge bar 170, one end of which is secured against rotatable or axial movement in a block 172 mounted on the upper surface of platform section 122 and secured thereto as by bolts or the like 174. The other end of rod 170 is slidably received in a bore in block 136 and may be secured in a desired position of adjustment by set screws 176 threadably engaged in block 136. The section 122 is provided with a slot indicated by broken lines at 178 in FIG. 8 in which a lug or bolt 180 (FIG. 9) is slidably engaged. The arrangement is such that block 136 may be moved transversely within the limits of slot 178 and clamped in a desired position of adjustment by tightening set screws 176 to bear frictionally against rod 170. Equivalent means to hold block 136 in a desired position of adjustment may be substituted. It is also contemplated that a plurality of gauge bars 170 may be provided, each being of a different length suitable for one of the plurality of tubes in the assembly.

Adjacent the end of platform section 122 remote from the latch mechanism there is further provided a pair of parallel slots 182 for transverse adjustment of the bifurcated section 160 and block 162. This may be effected by the provision of bolts 184 projecting downwardly through block 162 and through slots 182 with nuts or a plate with threaded bores (not shown) which may be tightened against the lower surface of section 122 by turning bolts 184.

The movable section 124 is further provided with means for vertical adjustment of the height of table 126, also for the purpose of ensuring precise alignment with the spindle of a machine tool. As shown in FIGS. 9 and 10, exemplary vertical adjustment means comprises a vertically arranged screw 190 on which is threadably engaged a horizontal flange 192 secured as by welding or the like to an upright support 194 for table 126. As best seen in FIG. 10, the upright support 194 preferably is in the form of a channel section, the closed or back surface of which is slidable with respect to the back surface of a fixed like channel section 196. The base of channel section 196 is secured as by welding or the like to the base of the movable section 124. A nut is non-rotatably secured to the lower end of the vertical screw 190, as shown at 198 in FIG. 9. Rotation of nut 198 causes rotation of screw 190 and thus raises or lowers flange 192 and support 194. Harnesses indicated at 200 are provided at spaced locations surrounding members 194 and 196 for clamping these members in a desired position of relative vertical adjustment selected by rotation of the screw 190, by tightening bolts or the like indicated at 202 in order to force the rear surfaces of members 194 and 196 into tight frictional engagement.

Rear support stand 116 may also be provided with vertical adjustment means of the same type described above.

While the invention has been described and shown in specific embodiments, modifications which will be apparent to those skilled in the art are considered to be within the scope and spirit of the invention, and no limitations are to be inferred except as set forth in the appended claims.

We claim:

1. A bar feed mechanism for a machine tool, comprising a cylindrical tube, a piston movable axially within said tube, a shaft rotatably secured to said piston and projecting therefrom toward said machine tool, a centering sleeve rotatably mounted on said shaft and axially movable thereon, center means secured to said shaft at the end thereof remote from said piston, said center means having a concave surface for engaging the trailing end of a bar, a bushing at the end of said tube adjacent said machine tool, said bushing having an orifice which permits passage of said center means therethrough but retains said centering sleeve, a pressure inlet for admitting pressure fluid behind said piston to cause movement thereof in a feeding direction, said inlet being connected to a source of hydraulic pressure, means to admit hydraulic pressure fluid between said piston and said centering sleeve, said centering sleeve being axially movable on said shaft at all times between said piston and said center means, and pressure relief means to permit discharge of pressure fluid from said tube between said piston and centering sleeve when said sleeve abuts said bushing whereby to permit continued movement of said piston, shaft and center means in said feeding direction.

2. The mechanism claimed in claim 1, including an end-of-bar sensing means, said pressure relief means being so positioned that it is covered by said piston near the end of a feeding stroke, whereby said end-of-bar sensing means is actuated by increased pressure within said tube.

3. A bar feed mechanism for a machine tool, comprising at least one elongated cylindrical tube of uniform inside diameter, closure means at the end of said tube remote from said machine tool, a piston movable axially within said tube, a pusher shaft rotatably secured to said piston and projecting therefrom towards said machine tool, a cylindrical centering sleeve rotatably mounted on said shaft and axially movable thereon within said tube, said piston and said sleeve each having a close sliding fit within said tube, center means releasably secured to said shaft at the end thereof remote from said piston, said center means having a concave surface at its end remote from said piston for engaging a trailing end of a bar being fed to said machine tool, said centering sleeve being interposed on said shaft between said piston and said center means and being axially movable therebetween at all times, a bushing at the end of said tube adjacent said machine tool having an axial orifice therein of a diameter sufficient to permit passage of said center means therethrough but to retain said sleeve, a source of hydraulic fluid under pressure, an inlet for said pressure fluid in said closure means at the end of said tube remote from said machine tool for moving said piston and said shaft toward said machine tool in the feeding direction, said inlet being connected to said source of hydraulic fluid, at least one additional inlet intermediate the ends of said tube for admitting pressure fluid ahead of said center means, means to admit pressure fluid between said piston and said sleeve, and pressure relief means in said tube effective after movement of said sleeve therebeyond in said feeding direction to drain said pressure fluid from said tube between said sleeve and piston whereby to permit continued movement of said piston, shaft and center means in said feeding direction.

4. The mechanism claimed in claim 3, wherein said means to admit pressure fluid between said piston and said sleeve comprises at least one passage from end to end of said piston generally parallel to the axis thereof through which said hydraulic fluid passes with minimum loss of pressure.

5. The mechanism claimed in claim 3, wherein said center means has an outside diameter permitting it to telescope within said centering sleeve.

6. The mechanism claimed in claim 3, wherein said center means has an outside diameter greater than the inside diameter of said centering sleeve whereby said center means and said centering sleeve abut one another during movement in said feeding direction.

7. The mechanism claimed in claim 3, wherein said source of hydraulic fluid under pressure includes a reversible-action fluid pump for supplying said pressure fluid to said tube and for withdrawing fluid therefrom under subatmospheric pressure.

8. The mechanism claimed in claim 7, including an end-of-bar sensing means, wherein said pressure relief means is so located in said tube that it is blocked by said piston near the end of a feeding stroke whereby to increase the pressure in said tube, said end-of-bar sensing means including a switch actuated by said increased pressure to inactivate said fluid pump.

9. The mechanism claimed in claim 7, including means for supplying pressure fluid to said at least one additional inlet at a lower pressure than said pressure fluid supplied to said inlet in said closure means.

10. The mechanism claimed in claim 2, including a plurality of said cylindrical tubes in parallel relation, said tubes being secured adjacent each end thereof in side-by-side relation with the axes of all tubes lying in a single plane.

11. The mechanism claimed in claim 10, including means to align each of said plurality of tubes with said spindle of said machine tool.

12. The mechanism claimed in claim 10, wherein each of said plurality of tubes is of a different inside diameter.

13. The mechanism claimed in claim 10, wherein at least two of said plurality of tubes are of the same inside diameter.

14. The mechanism claimed in claim 10, including means for supporting said plurality of tubes, and means for moving the end of said plurality of tubes adjacent said machine tool through an arc of at least 90° in either of two directions for reloading said tubes.

15. The mechanism claimed in claim 14, wherein said means for supporting said plurality of tubes comprises a stand adjacent said machine tool and a stand remote from said machine tool, said adjacent stand having a base section permanently secured to a floor, a movable section releasably secured to said base section, and latch means interconnecting said base section and said movable section, release of said latch means permitting arcuate movement of said movable section away from said machine tool.

16. The mechanism claimed in claim 15, including means for transverse adjustment of the alignment of said movable section, and means for vertical adjustment of the alignment of said movable section.

17. The mechanism claimed in claim 15, wherein said stand remote from said machine tool is provided with pivot means about which said plurality of tubes rotates when moved in said arc.

* * * * *